United States Patent [19]
Kakuta

[11] Patent Number: 5,363,807
[45] Date of Patent: * Nov. 15, 1994

[54] AUTOMATED PORTABLE PET TOILET

[76] Inventor: Kihachiro Kakuta, 4-Chome 74 Banchi, Apartment 711 Sueyoshi-cho, Kanka-Ku, Yokohama-shi Kanagawa-ken, Japan

[*] Notice: The portion of the term of this patent subsequent to Jan. 18, 2011 has been disclaimed.

[21] Appl. No.: 175,615

[22] Filed: Dec. 30, 1993

Related U.S. Application Data

[63] Continuation of Ser. No. 840,075, Feb. 20, 1992, Pat. No. 5,279,258.

[51] Int. Cl.$^5$ ............................................. A01K 1/01
[52] U.S. Cl. .................................... 604/164; 604/163
[58] Field of Search ............... 119/161, 163, 164, 165, 119/167

[56] References Cited

U.S. PATENT DOCUMENTS

| | | | |
|---|---|---|---|
| 3,937,182 | 2/1976 | Kamimura | 119/161 |
| 4,011,837 | 3/1977 | Ksioszk | 119/164 |
| 4,574,735 | 3/1986 | Hohenstein | 119/161 |
| 4,660,506 | 5/1987 | Nalven | 119/163 |
| 4,787,334 | 11/1988 | Bassine | 119/165 |
| 4,844,011 | 7/1989 | Strickland | 119/164 |
| 5,184,575 | 2/1993 | Reinartz | 119/163 |
| 5,188,062 | 2/1993 | Joy et al. | 119/164 |

FOREIGN PATENT DOCUMENTS

| | | | |
|---|---|---|---|
| 2648313 | 12/1990 | France | 119/165 |
| 3534522 | 4/1986 | Germany | 119/164 |

*Primary Examiner*—John G. Weiss
*Attorney, Agent, or Firm*—Rod D. Baker

[57] ABSTRACT

A portable electromechanical apparatus for easily and hygienically managing and disposing of pet wastes. The apparatus contains separate solid and liquid waste collectors and containers, located beneath a platform. A waste receiving member is provided upon the platform upon which a pet's solid waste is deposited. Electronic circuitry detects the presence of a pet and judges whether excretion has taken place, whereupon the waste receiving member, bearing the excrement, is moved off the platform and into a solid waste receptacle. A mechanism for automatically opening the solid waste receptacle is provided.

20 Claims, 13 Drawing Sheets

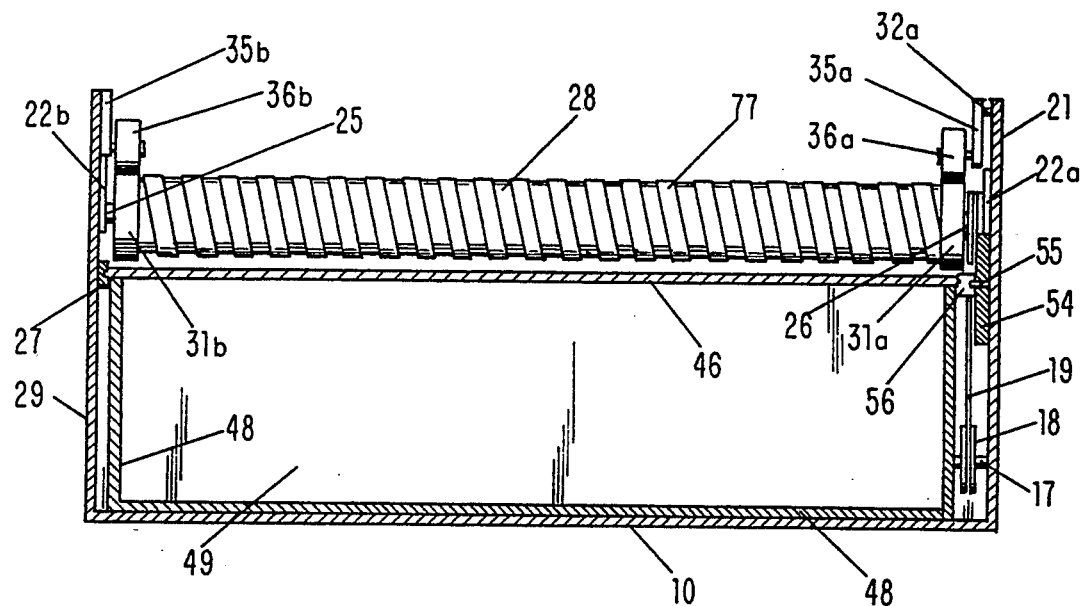
FIG—5
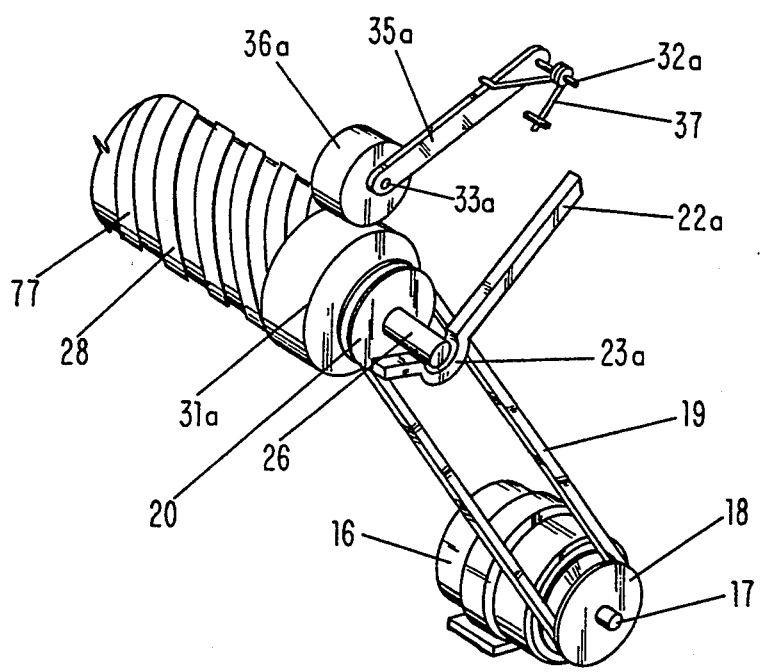
FIG—6

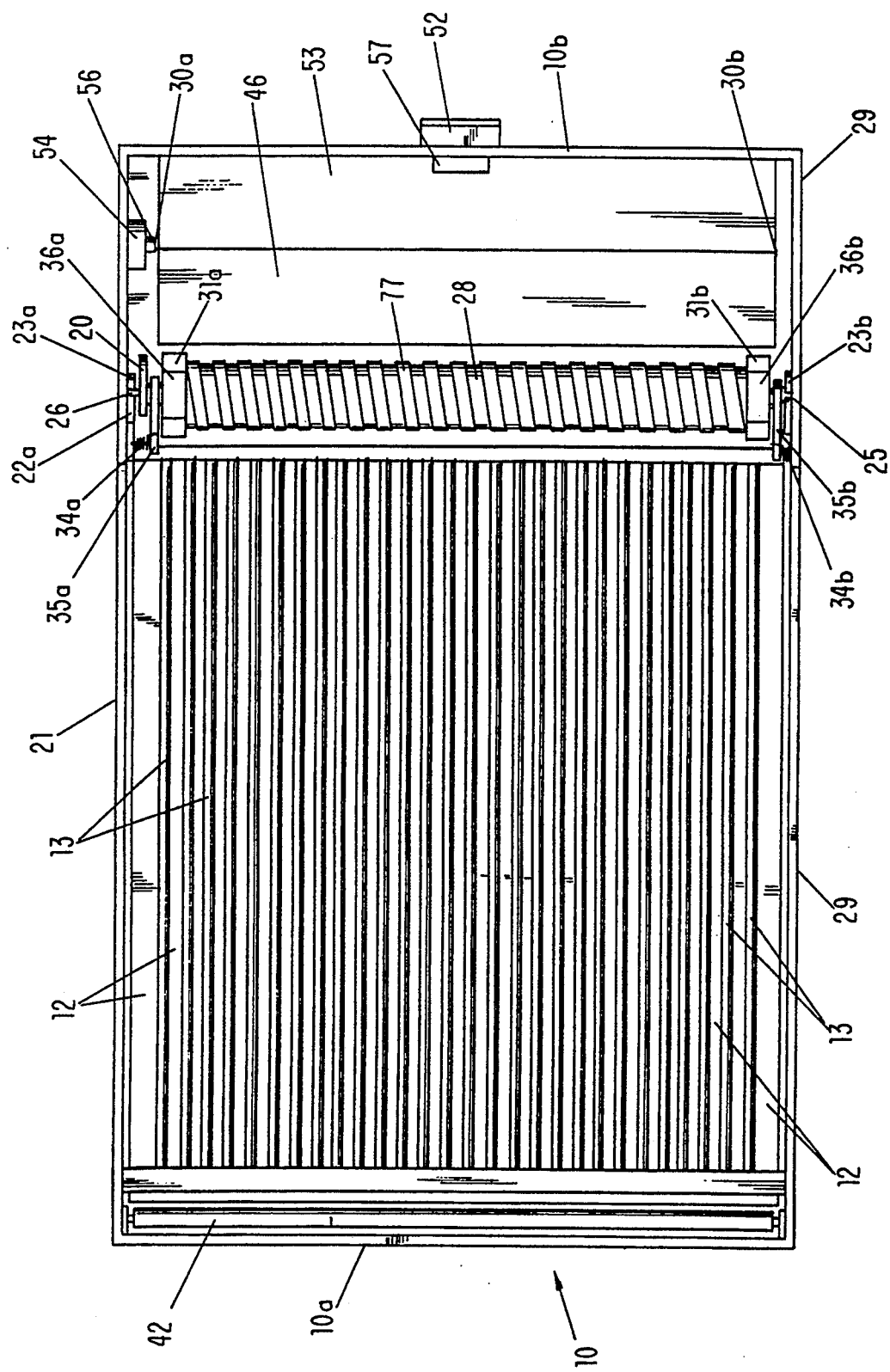
FIG—7

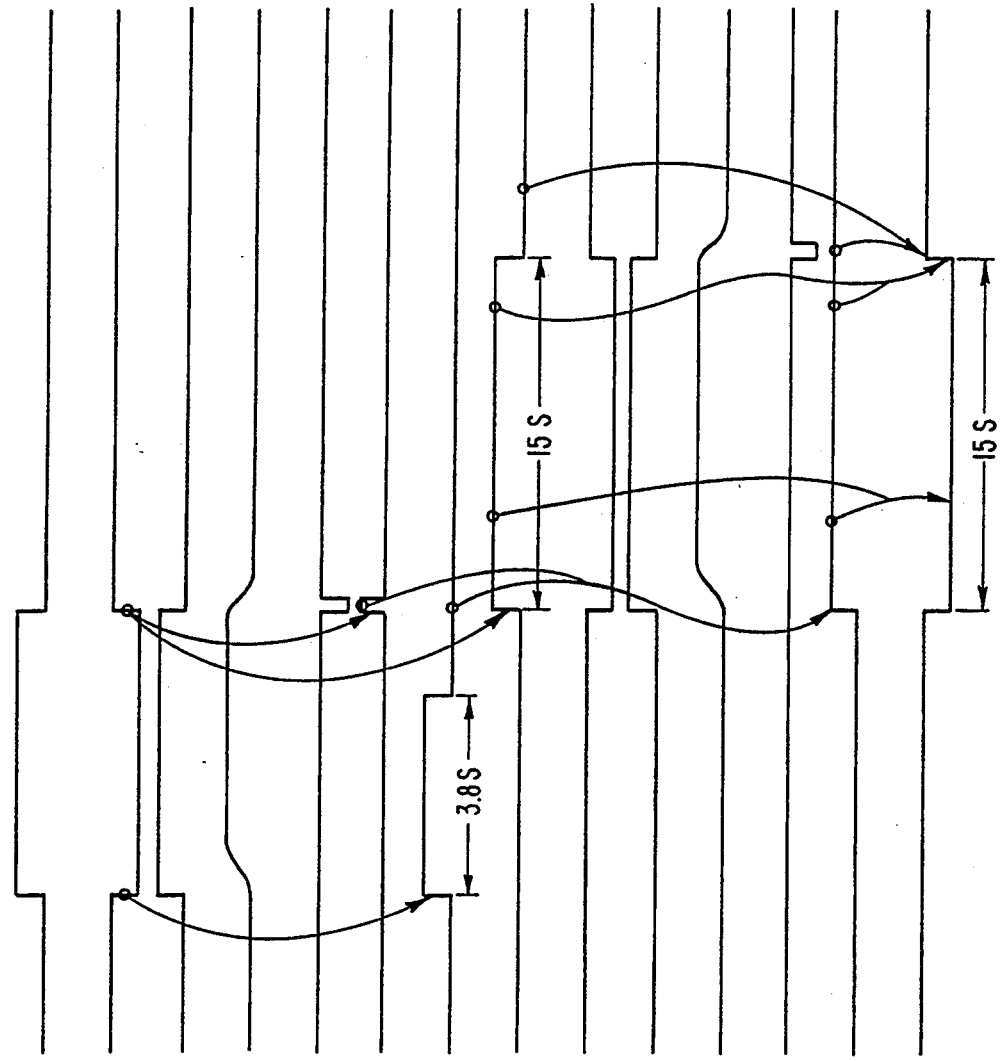

FIG-12

A OUTPUT A OF DETECTING CIRCUIT FOR SENSOR OUTPUT 59
B OUTPUT OF INVERTER 61
C OUTPUT OF INVERTER 62
D OUTPUT OF INTEGRAL CIRCUIT 63
E OUTPUT OF NAND GATE 64
F OUTPUT OF INVERTER 65
G OUTPUT-O OF MINIMUM RESIDENT TIME DETECTING CIRCUIT 67
H OUTPUT-O OF TIME SETTING CIRCUIT FOR DRIVING THE SENSOR 68
I OUTPUT-Ō OF TIME SETTING CIRCUIT FOR DRIVING THE MOTOR 68
J OUTPUT OF INVERTER 72
K OUTPUT OF INTEGRAL CIRCUIT 73
L OUTPUT OF NAND GATE 71
M OUTPUT-Ō OF JUDGEMENT CIRCUIT 66
N OUTPUT OF GATE CIRCUIT 69

AUTOMATED PORTABLE PET TOILET

CROSS-REFERENCE TO RELATED APPLICATIONS

This application is a continuation application of U.S. Pat. application Ser. No. 07/840,075, entitled Automated Portable Pet Toilet, to Kakuta, filed on Feb. 20, 1992 now U.S. Pat. No. 5,279,258, the teaching of which is incorporated herein by reference.

BACKGROUND OF THE INVENTION

1. Field of the Invention (Technical Field)

This invention relates to an automated portable pet toilet in which a clean, unused portion of a waste-receiving member is provided automatically each time the pet steps off a platform after excretion.

2. Background Art

Pets provide companionship, which is recognized as being beneficial to the well-being of single working people, the elderly living alone, and children. The company of a pet can also relieve fatigue in pet owners driving long distances. Pets are, of course, popular among people generally. In each case, there is a need for a lightweight, convenient, and attractive portable pet toilet that does not require daily cleaning and that does not emit odors. The present invention meets that need for all pets, especially dogs and cats, which can be trained to excrete in a given location.

There are several devices in the existing art which replace the ordinary litter box. U.S. Pat. No. 3,937,182, to Kamimura, entitled Pet Toilet, discloses a pet toilet in which liquid and solid wastes are collected separately by means of a manually operated filter belt that slides over a sloped tray into two receptacles: one for collecting liquid waste, and one for collecting solid waste. This device requires daily maintenance, as, in order to clean the litter after each use, the pet owner must operate the belt manually.

U.S. Pat. No. 4,846,104, to Pierson, entitled Automatic Cat Toilet, describes a cat toilet in which cat solid waste and cat urine-saturated litter mass is separated from surrounding cat litter by automatic rotation. The rotation also serves to blend unused litter with the litter previously in contact with the saturated litter mass. After processing, the cat waste is stored in a disposable waste bag liner. The rotation mechanism must be activated manually in order to separate out the cat waste. Since the litter is reused, the cat's paws come in contact with bacteria, as in standard litter boxes.

U.S. Pat. No. 3,734,057, to Lee, et al., entitled Pet Toilet, discloses a system based on a mechanism providing predetermined delay time in response to detection of a pet, and an output signal provided by photoelectric means, which activates the cleaning of waste by water flushing.

U.S. Pat. No. 4,729,342, to Loctin, entitled Self Cleaning Pet Toilet, discloses a housing with walls which are automatically sprayed with water, and a sensor, informed by a timer, which closes the door of the housing after the pet leaves the toilet.

In both immediately preceding cases, the portability of the pet toilet described is limited by the connection to a water source and drain, as well as by the expensive necessity for special installation, which then limits the capacity of the drain. These Pet Toilets occupy shared space in the bathroom.

SUMMARY OF THE INVENTION

The present invention is of a portable pet toilet, an automated pet toilet, and a method of using an automated pet toilet.

The portable pet toilet of the invention comprises a platform, a waste receiving member movable across the platform, a solid waste receptacle below the platform, a motorized assembly for moving the waste receiving member toward the solid waste receptacle, and a liquid waste receptacle. In the preferred embodiment, the waste receiving member is a sheet of paper, most preferably a rolled strip of paper with its free end movable across the platform. The motorized assembly comprises a motor and at least one driver for moving the waste receiving member. The driver may be a belt and pulley, interlinking gears, a sheet-driving roller having a frictional surface, or a roller mounted endless belt. The invention preferably further comprises a holding member for holding the waste receiving member firmly against the driver. The holding member may be a torsion spring and at least one rotatable holding roller pressed against the waste receiving member by the spring or may be at least one rotatable holding roller connected by a gear train to the motor. Preferably, the portable pet toilet further comprises an activator (such as a motor control circuit) for actuating the motorized assembly after a pet has excreted, and a rotary solenoid for automatically opening a lid in the solid waste receptacle.

The automated pet toilet of the invention comprises a platform, a detector of the presence of a pet upon the platform, a sensor of whether the pet has deposited excreta upon the apparatus, and a conveyor of the excreta to a receptacle. In the preferred embodiment, the platform accommodates both solid excreta and liquid waste and the detector is an infrared sensor attached to a signal device signalling when the pet steps upon the platform and when the pet steps off the platform. The sensor is preferably a minimum resident timer detecting circuit, comprising a variable resistor and a pet departure detecting circuit. Alternatively, the sensor may be a judgment circuit. The conveyor preferably comprises a movable waste receiving member mounted upon the platform and a motor, comprising a timer setting motor drive circuit and a variable resistor, energized by the signal device signalling when the pet steps off the platform or a manually actuable energizing circuit. The receptacle is preferably covered by a movable cover operated by a rotary solenoid having a timer setting motor drive circuit or a manually actuable energizing circuit.

The method of the invention of using an automated pet toilet comprises providing a platform, detecting the presence of a pet upon the platform, determining whether the pet has deposited excreta upon the toilet, and conveying the excreta to a receptacle. In the preferred embodiment, the method accommodates both solid excreta and liquid waste on the platform, detecting the presence of a pet further comprises supplying a signal when the pet steps upon the platform and supplying a signal when the pet steps off the platform, and determining whether the pet has deposited excreta further comprises providing a minimum resident timer detecting circuit, a pet departure detecting circuit, or a judgment circuit. Conveying excreta further comprises providing a movable waste receiving member upon the platform, providing a motor energized by supplying a signal when the pet steps off the platform, or providing a rotary solenoid energized by supplying a signal when the pet steps off the platform.

Accordingly, it is a primary object of the present invention to provide a light weight and portable pet toilet.

Another object of the invention is the provision of a fully automated pet toilet that separates and removes both solid and liquid waste.

Yet another object of the invention is the provision of variable timing means for adjusting operation intervals.

An advantage is that the present pet toilet collects waste in separate covered receptacles.

Another advantage of the invention is that it operates without a water supply.

Yet another advantage of the invention is provided by its ease of maintenance and cleaning.

Still another advantage of the invention is its provision for rapid replacement of expended components. The pet's paws are not in contact with used litter, so the advantage of indoors hygiene is maintained, and the recurring presence of a clean portion of the waste-receiving member gives a sanitary appearance to the pet toilet in any room.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 5 is a sectional view taken along a line c-c' of FIG. 2;

FIG. 6 is a partial perspective view of a transfer system of motor driving power;

FIG. 7 is a plan view of the automated toilet for a pet;

FIG. 12 is a timing chart showing when a pet steps on the platform;

DESCRIPTION OF THE PREFERRED EMBODIMENTS (BEST MODES FOR CARRYING OUT THE INVENTION)

Figure 1:
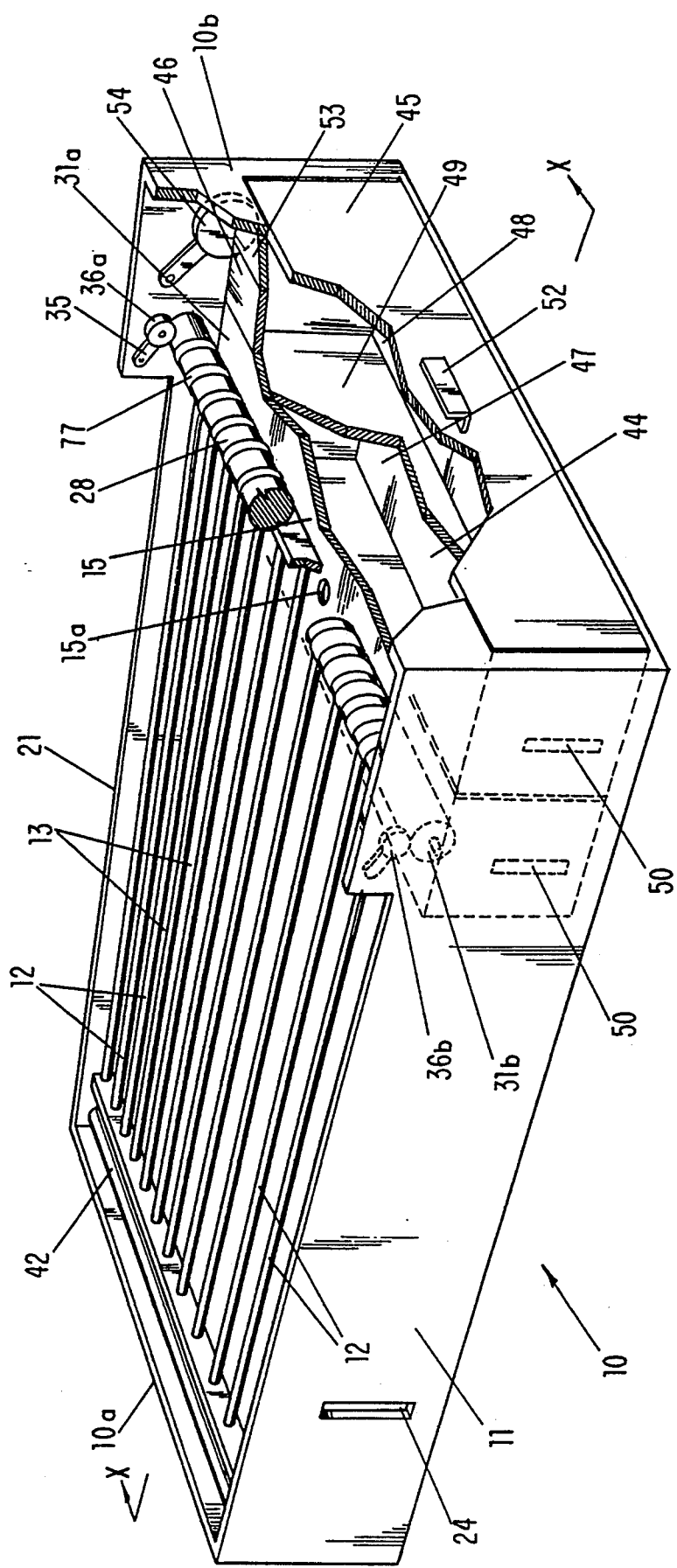
FIG. 1 is a partially cut perspective view of the present invention.
Figure 2:
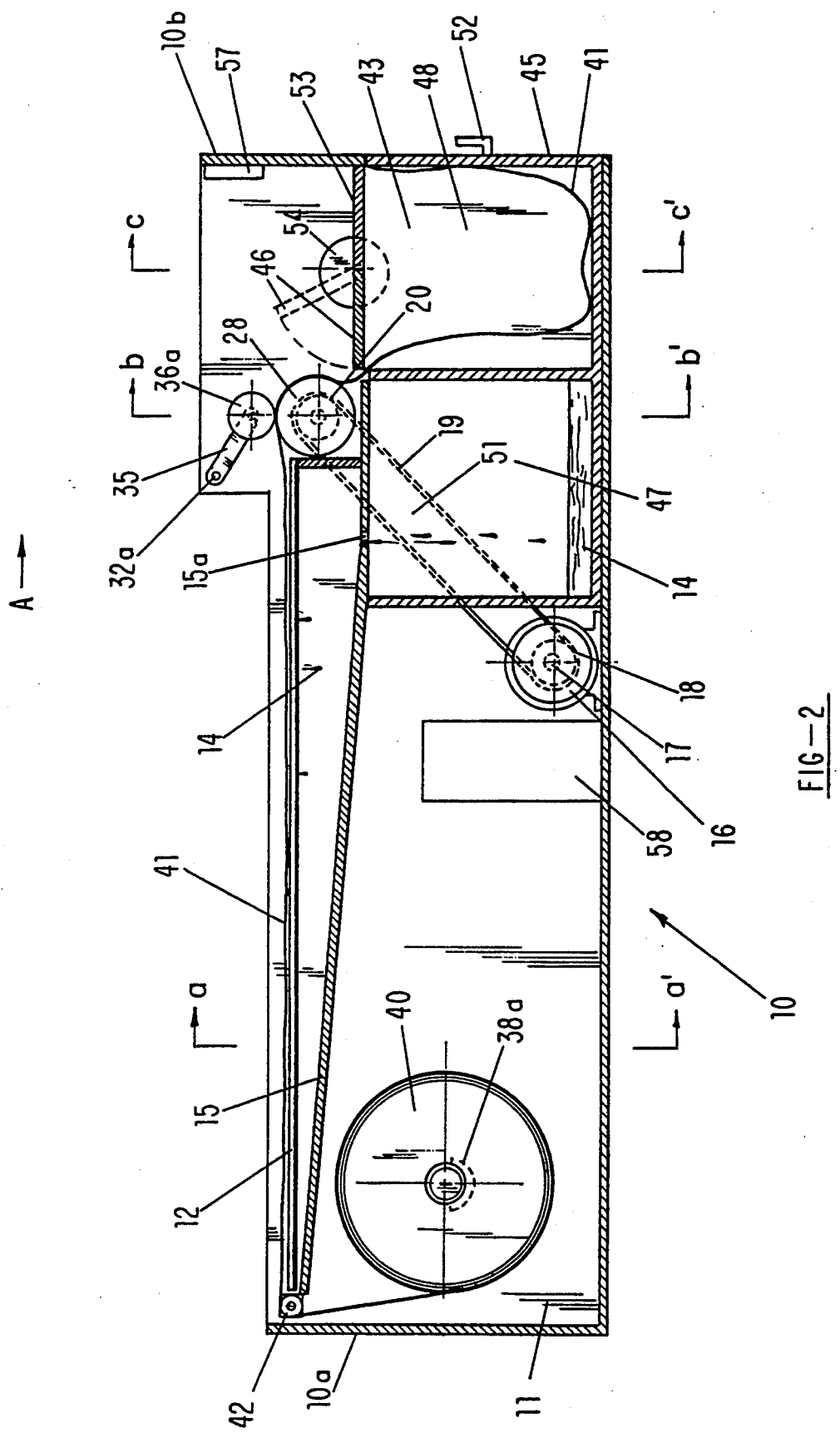
FIG. 2 is a sectional side view taken along a line X-X' of FIG. 1.

As shown in FIGS. 1 and 2, toilet body 10 is a rectangular-shaped box the top portion of which is mostly open. Mounted on the top portion of toilet body 10 is a rectangular-shaped platform 12, on which a pet steps, and which can be assembled and disassembled for maintenance. Platform 12 has slits 13 through which the pet's liquid waste 14 is allowed to fall. Below platform 12 and enclosed by toilet body 10 is empty space 11.

Located below platform 12, above empty space 11, is liquid waste collecting tray 15. Liquid waste collecting tray 15 is removably mounted on toilet body 10 so that it can be removed, cleaned, and later reassembled.

Liquid waste collecting tray 15 receives liquid waste 14 as liquid waste 14 falls through slits 13 of platform 12. The liquid waste collecting tray 15 acts as a funnel, since it is slanted downward from one end 10a toward the other end 10b of toilet body 10, and from front wall 29 and back wall 21, toward a center outlet hole 15a. At the end of liquid waste collecting tray 15, on the side 10a, is attached a rotatable guide roller 42 that revolves and conveys waste-receiving member 41 smoothly onto platform 12. Collected liquid waste 14 falls down into liquid waste receptacle 47 through opening 51, located on the upper face of liquid waste receptacle 47 and adjacent to center outlet hole 15a (see FIG. 2).

In space 11, under liquid waste collecting tray 15, driving motor 16, having built-in gears, is attached to toilet body 10. Output axis 17 of driving motor 16 is coupled with pulley 18. Pulley 18 is linked with V-belt 19, in turn linked with pulley 20, which is fixed to a sheet driving roller 28.

Figure 4:
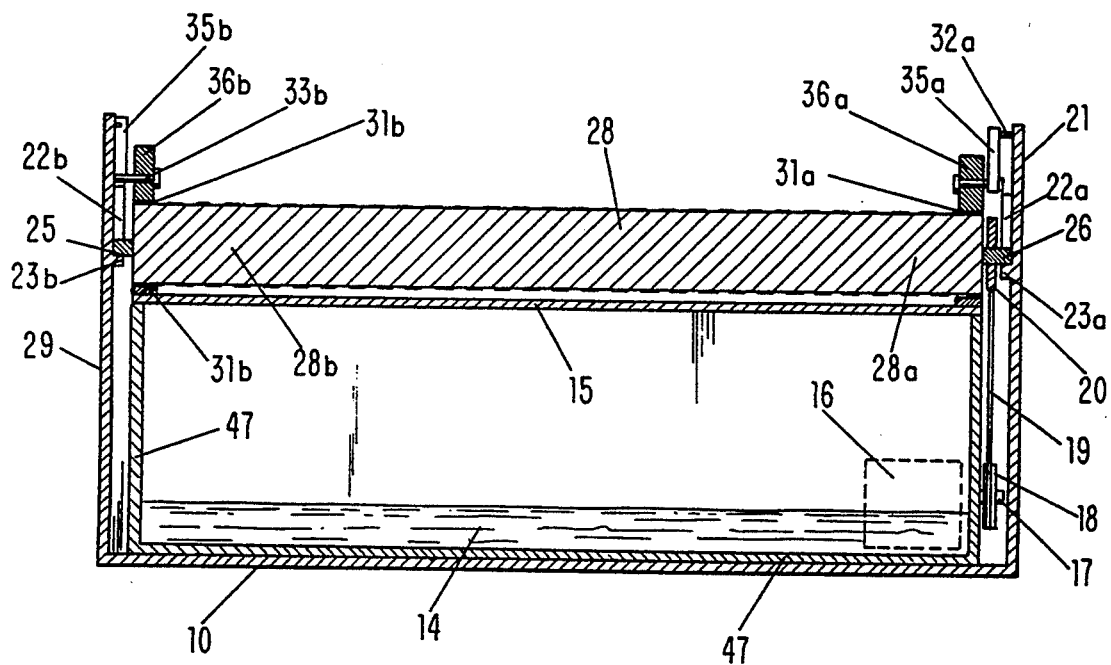
FIG. 4 is a sectional view taken along a line b-b' of FIG. 2.

Sheet driving roller 28 is mounted on the toilet body 10, adjacent the end of platform 12, opposite end 10a and above receptacle 45, so that sheet driving roller 28 can be assembled and disassembled. At the end of sheet driving roller 28, shafts 25 and 26 are fixed on each side, as shown in FIG. 4. Shafts 25 and 26 are mounted to the depressed supporting bearings 23a and 23b, mounted on the inner side of the back wall 21 and 29, in order that sheet driving roller 28 can revolve freely. The top portions of bearings 23a and 23b are opened in a V-shape so that sheet driving roller 28 can be removed from toilet body 10 for cleaning.

As illustrated in FIGS. 4, 5, and 7, an inclined guide rail 22a leads to the V-shaped opening of depressed supporting bearing 23a and is attached to back wall 21. In the same way, guide rail 22b and bearing 23b are attached to front wall 29. Guide rails 22a and 22b enable sheet driving roller 28 to easily glide along guide rails 22a, 22b, when placing sheet driving roller 28 back on toilet body 10.

Reference is made to FIGS. 2 and 4. Pulley 20 is coaxially fixed to shaft 26, located at one end of sheet driving roller 28a. V-belt 19 is linked to pulley 20. Sheet driving roller 28, powered by driving motor 16, is rotated via pulley 18, V-belt 19, and pulley 20, coupled respectively in order for sheet driving roller 28 to revolve and carry forward waste receiving member 41 to solid waste receptacle 48.

Around both ends of the section 28a and 28b of sheet driving roller 28, a preferred width of frictional material, such as rubber, is wound to construct frictional rollers 31a and 31b. Holding roller 36a, comprised of frictional material of a certain width, is rotatably mounted above frictional roller 31a. Holding roller 36a may comprise various kinds of material, but is preferably made from rubber. As best shown in FIG. 6, holding roller 36a is supported rotatably by axis 33a, which is fixed on the edge of arm 35. The other end of arm 35 is pivotably mounted on the upper part of back wall 21 by post 32. Pivotably operated arm 35 is normally urged in a counterclockwise direction by torsion spring 37 received about post 32 (see FIG. 6). Thus holding roller 36a provides downward pressure upon the upper surface of frictional roller 31a.

The explanation of the structure of holding roller 36b, which is located on the opposite side of holding roller 36a, is omitted, as it is the same as for holding roller 36a.

When driving motor 16 is energized, the driving power is transmitted respectively to pulley 18, V-belt 19, and pulley 20, one after another, and consequently to pulley 20, fixed coaxially on shaft 26 of sheet driving roller 28, causing sheet driving roller 28 to revolve. Due to the revolving of sheet driving roller 28, the rotating movement of frictional roller 31a and frictional roller 31b (which are on both sides of sheet driving roller 28) is transmitted to corresponding holding rollers 36a and 36b (which are paired with frictional rollers 31a and 31b, vertically facing one another). The external surfaces of these rollers are constantly touching each other by the pressure from spring 37. Thus, vertically paired frictional roller 31a and holding roller 36a, as well as frictional roller 31b and holding roller 36b, cause each other to rotate by frictional force. Thus, when waste-receiving member 41, held at both edges, is led between these sets of rollers, waste-receiving member 41 can be transferred from one side of toilet body 10a to the other side 10b in the direction of arrow A, as shown in FIG. 2.

Figure 8:
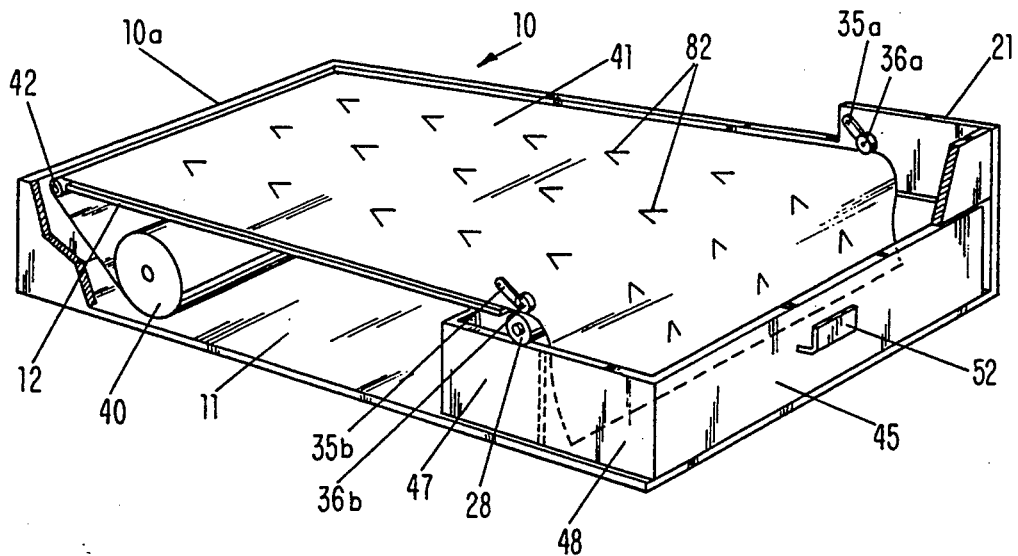
FIG. 8 is a partially cut perspective view of the pet toilet showing a rolled sheet installed.

FIG. 8 shows the function of waste-receiving member 41 on which the waste excreted from a pet is received and transferred to the solid waste receptacle 48.

Figure 3:
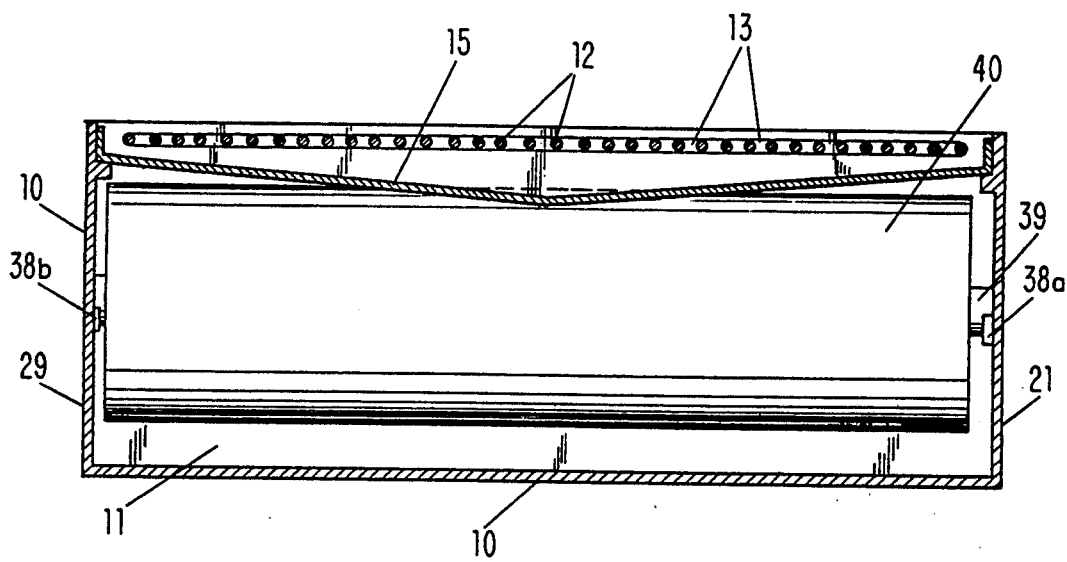
FIG. 3 is a sectional view taken along a line a-a' of FIG. 2.

Reference is made to FIGS. 2 and 3. Preferably located in space 11, under platform 12 and liquid waste collecting tray 15, is waste-receiving member 41, in the rolled state referred to as rolled sheet 40. On the inner face of front wall 29 and back wall 21, a pair of depressed supporting bearings 38a and 38b are fixed on each face to hold a shaft 39, mounted into the core of "rolled sheet" 40, in order to rotate freely and cause the setting of a new roll into the toilet body 10. Waste-receiving member 41, which receives the waste, thus may be led onto platform 12.

In addition, platform 12 and liquid waste collecting tray 15 can be removed from toilet body 10 in order to set the "rolled sheet" 40 into the space 11 in toilet body 10. Shaft 39 is set into the core of the "rolled sheet" 40, and both ends of the shaft are placed onto supporting bearings 38a and 38b, which can be seen in space 11.

Moreover, the installation of rolled sheet 40 is not limited to one method. It can be done in other ways, such as installing an access door that can be open and shut freely onto a side wall of 10a of toilet body 10.

Reference is now made to FIGS. 2 and 8. The initial part of this rolled sheet 40 is paid out onto platform 12 via rotatable guide roller 42, which is attached to the end section 10a of liquid waste collecting tray 15. Thus, waste-receiving member 41 is paid out onto platform 12, fed from rolled sheet 40. Both edges of waste-receiving member 41 are then held between holding rollers 36a, 36b and frictional rollers 31a, 31b, located at both ends of sheet driving roller 28. Waste-receiving member 41 is led into solid waste receptacle space 48. Thus, waste-receiving member 41, which has been paid out onto platform 12, is pulled by these rollers, held at both edges, conveyed by sheet driving roller 28, and then transferred to solid waste receptacle 48. Meshed net 77, preferably composed of rubber or other high-friction material, is wound around the external surface of sheet driving roller 28 and between frictional roller 31a and frictional roller 31b, in order to transport waste-receiving member 41 without slippage. Meshed net 77 has a more important function of preventing waste-receiving member 41 from adhering to sheet driving roller 28; if waste receiving member 41 is made of paper or a similar material, it may stick to sheet driving roller 28 when wetted by liquid waste 14.

In this embodiment, use of meshed net 77 is preferred, but the embodiment is not limited to this use. An equivalent member may be composed of a single cord spirally wound around sheet driving roller 28 in the same manner as screw threads or similar structures.

Figure 9:
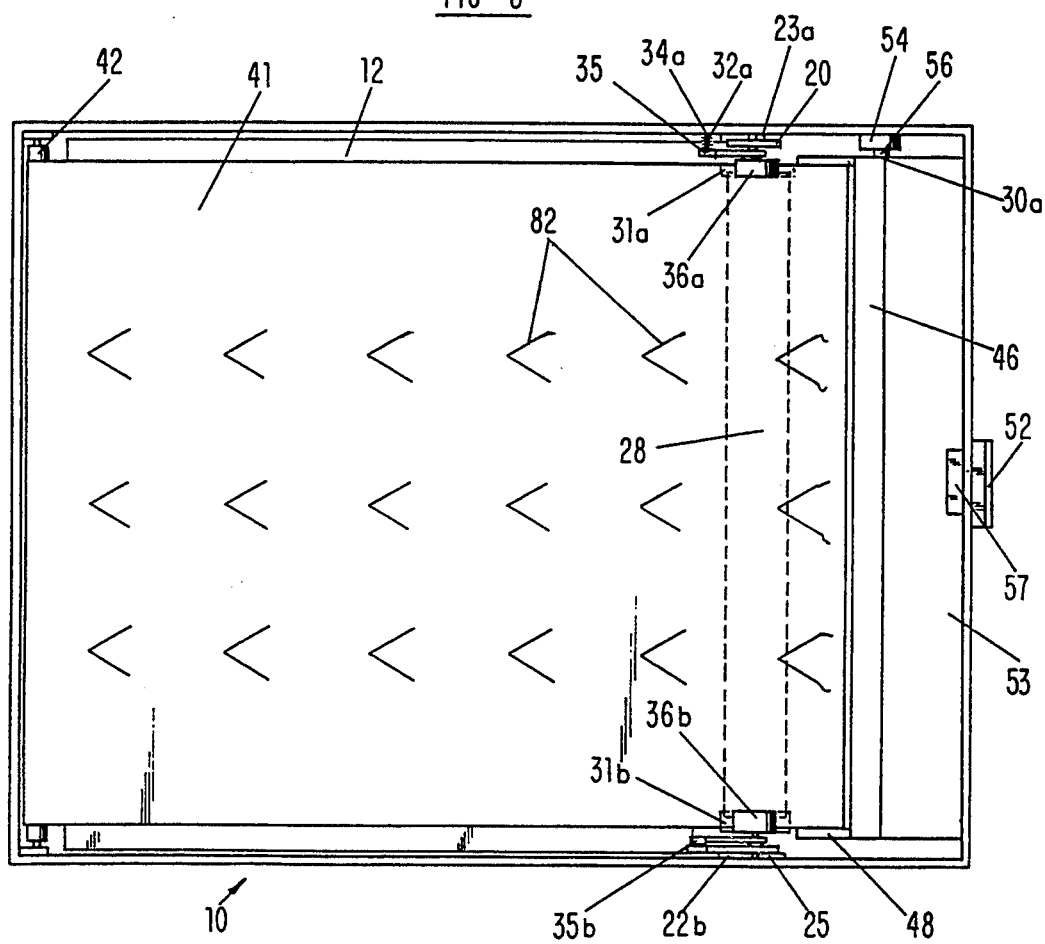
FIG. 9 is a plan view of the pet toilet showing a rolled sheet installed.

FIG. 9 shows V-shaped notches in waste-receiving member 41. V-shaped notches 82 can be cut into the waste receiving member 41 in any pattern which allows liquid waste 14, deposited by the pet on platform 12, to fall immediately through to the liquid waste collecting tray 15. The notches 82 prevent overflow of excessive liquid waste on the waste-receiving member 41, especially when waste-receiving member 41 is made of paper or similar waterproof material. The notches 82 effectively prevent liquid waste from spreading over the paper, keeping both edges of the paper dry, which is important in maintaining the strength of the edges, held by the rollers 36a, 36b, 31a, and 31b.

In addition, in this embodiment, use of V-shaped notches 82 is preferred, but it is possible to use small holes or the like, as long as they have the similar function of allowing liquid waste 14 to flow through to the liquid waste collecting tray 15 under platform 12. However, in this alternative design, there is a concern that part of the solid waste might soil platform 12 through the openings of the holes facing and touching platform 12. By using V-shaped notches 82, there is less likelihood of solid waste matter touching platform 12.

Additionally, if waste receiving member 41 is made of paper or similarly permeable material, the following could be considered as a way of keeping the edges of the paper dry: the edges could be waxed or oiled to prevent weakening when wetted by liquid waste.

In the present embodiment frictional material is preferred for the frictional roller 31, but it is not limited to such material. As long as this member has frictional capability in its design, any substitute such as a "rollette" design can be used instead of this frictional material.

Number 24 in FIG. 1 shows a window through which the amount of waste-receiving member 41 remaining on the rolled sheet 40 can be seen and the need for replacement of a new rolled sheet 40 can then be determined.

Referring to FIGS. 1 and 2, receptacle section 43 consists of an empty space portion 44, receptacle 45, and lid 46. Space 44 is located at side 10b of toilet body 10. Receptacle 45 can be slidably inserted into and withdrawn from this space 44 freely.

Receptacle 45, a rectangularly shaped box, is divided into two chambers by partition 49, defined as liquid waste receptacle 47 and solid waste receptacle 48, and maintained in order to segregate the liquid waste from the solid waste, as the two wastes mixed would generate a strong odor. The top face of each receptacle 47,48 is open to take in the waste. Lid 46 covers the opening of solid waste receptacle 48, thus preventing escape of unpleasant odor. Lid 46 is attached to the free side or edge of stage 53, which is fixed to the inner side of toilet body 10, surrounded by back wall 21, another side wall 10b, and front wall 29, all situated above solid waste receptacle 48, as best shown by FIGS. 2 and 7. Lid 46 is mounted between front wall 29 and back wall 21, adjacent stage 53 with rotary pivots 30a and 30b for opening and shutting the lid. Pivots 30a and 30b extend from the side corners of lid 46 adjacent stage 53. Referring to FIG. 5, it is observed that pivot 30b is mounted pivotably and supported on a recessed bearing 27, which is fixed on the inside face of front wall 29. Pivot 30a is coupled respectively with rotary solenoid 54, which is coaxially mounted at the center of the inner face of back wall 21, between stage 53 and lid 46. The driving axis 55 of rotary solenoid 54 is coupled with pivot 30a via coupling 56, so that when rotary solenoid 54 is actuated axis 55 rotates coupled pivot 30a. This rotary movement is then imparted to lid 46, causing it to rotate in a clockwise direction (as seen in FIG. 2). Consequently, lid 46 opens when rotary solenoid 54 is driven.

When electrical power is shut off, lid 46 is shut by a built-in spring within rotary solenoid 54. In this embodiment, the use of rotary solenoid 54 is preferable, but a plunger solenoid or other device could be used as long as such a mechanism serves the same function of opening and shutting lid 46.

When it becomes necessary to empty the waste from the receptacles 47,48 the receptacles 47,48 are taken out from toilet body 10. Waste receiving member 41, which is led in a continuous sheet from platform 12 to the solid waste receptacle 48, has to be cut and separated transversely at the end of sheet driving roller 28 in order to take receptacles 47,48 out from the housing space 44. It could be cut by using an ordinary cutter along the free transverse edge of lid 46, or by a cutter fixed on the end of lid 46 at the time lid 46 is shut.

As clearly illustrated in FIG. 2, an infrared sensor 57 is installed on the upper part of the internal surface of side wall 10b to detect the presence of the pet when it gets on or off platform 12. The output terminal of infrared sensor 57 is connected with an input terminal of electronic circuit section 58. An output terminal of electronic circuit section 58 is connected with an input terminal of driving motor 16.

Figure 10:
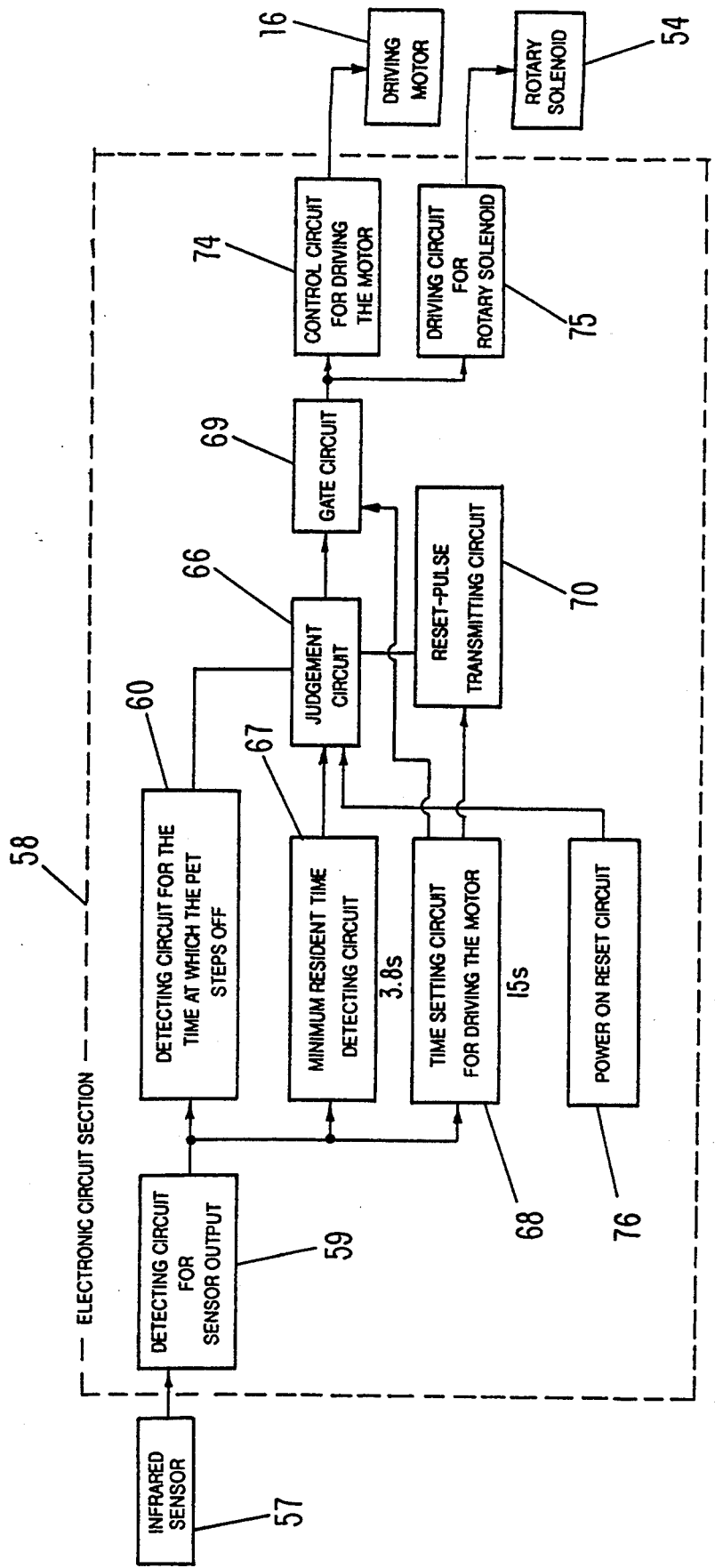
FIG. 10 is a block diagram illustration of the electronic circuit.
Figure 11:
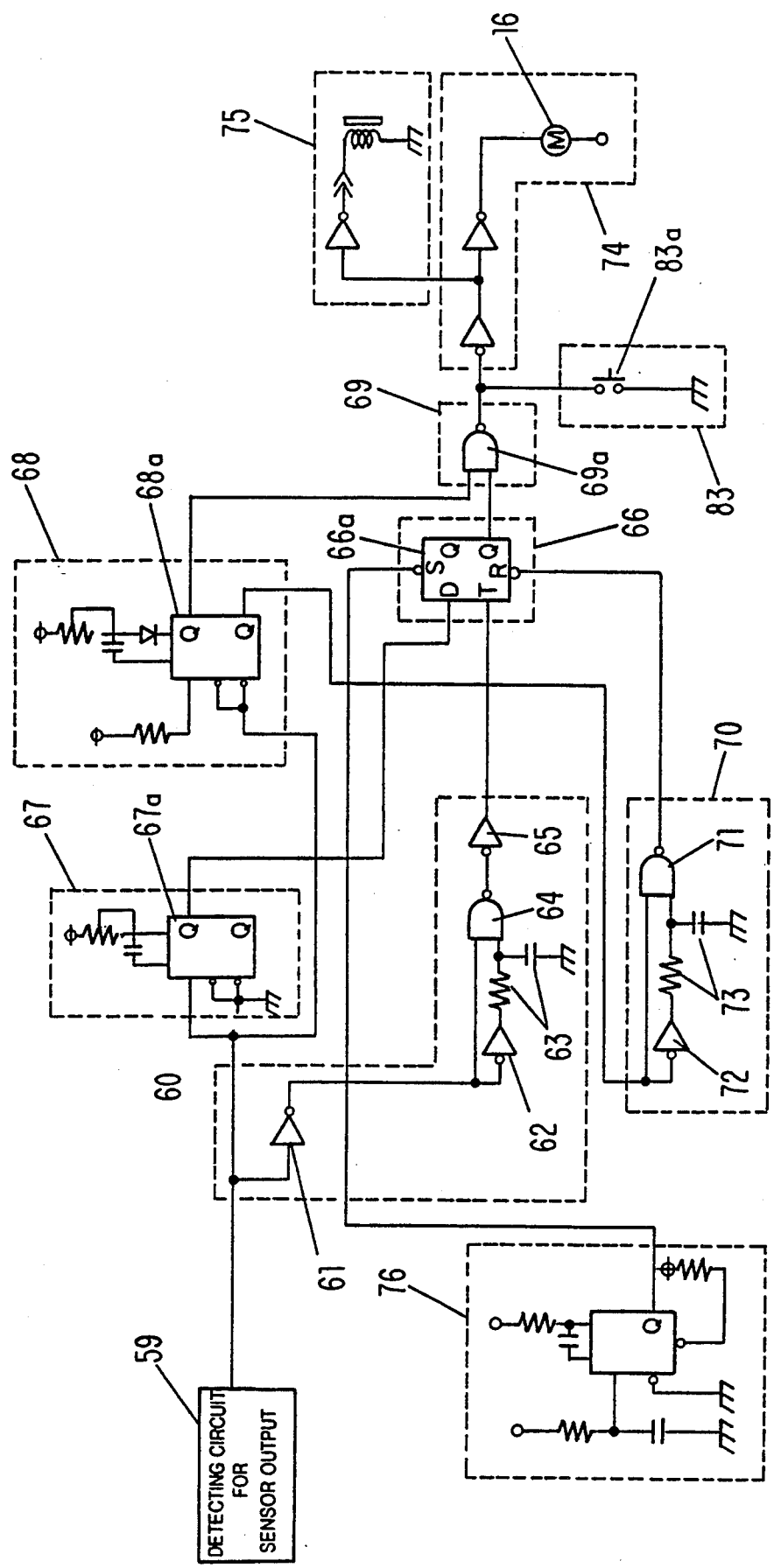
FIG. 11 is a circuit chart illustration of the electronic circuit.

The explanation of electronic circuit section 58 can be found in FIGS. 10 and 11.

An output of the infrared sensor 57 is connected to the input of the sensor output detecting circuit 59 of electronic circuit 58. Sensor output detecting circuit 59 supplies an H-level signal when a pet steps on platform 12, and an L-level signal when the pet steps off platform 12. The output of sensor output detecting circuit 59 is connected to the input of the departure detecting circuit 60 (for the time at which the pet steps off) when a pet steps off platform 12. Departure detecting circuit 60 is comprised of inverter 61, which is connected to the output of the sensor output detecting circuit 59 and an input terminal of nand gate 64, The other input terminal of nand gate 64 is connected to inverter 61 via inverter 62 and integrating circuit 63. Inverter 65 is connected to the output of nand gate 64.

Departure detecting circuit 60 supplies an H-level signal at the time when the pet steps off the platform 12.

The output of the departure detecting circuit 60 is connected with the T-input-terminal of judgment circuit 66, which is a Q-type flip-flop circuit 66a.

The output of the sensor output detecting circuit 59 is also connected with the input of a minimum resident time detecting circuit 67 which meters the time considered normal for a pet to eliminate. Minimum resident time detecting circuit 67 comprises a non-trigger type one-shot multivibrator 67a. It supplies an H-level signal at a preset time after the pet steps on platform 12. This required time means a duration of time which is assumed to be from when the pet steps on the platform until the pet steps off the platform 12 for reasons other than elimination of waste. In this embodiment, this required time is set up as 3.8 seconds. When the pet stays on platform 12 more than 3.8 seconds, minimum resident time detecting circuit 67 judges that the pet completed excretory function. However, this time can be set according to any time estimated as necessary for excretion.

This timer can be set for an optional time by adjusting the variable resistance of one-shot multivibrator 67a.

Output of the minimum resident time detecting circuit 67 is connected to the D-input-terminal of judgment circuit 66. Therefore judgment circuit 66 judges whether the pet remained on platform 12 the required time of 3.8 seconds, by means of an output signal to the Q-terminal. The output signal to the $\overline{Q}$-terminal is reversed from an input signal on the D-terminal at the time an H-level input signal is input to the T-input-terminal of judgment circuit 66. This means judgment circuit 66 judges whether the pet finished excretory function by timing when the pet steps off platform 12. That is to say, judgment circuit 66 judges whether the pet stayed on platform 12 longer than 3.8 seconds.

The output of the sensor output detecting circuit 59 is also connected to the input of time setting circuit 68 for driving the motor.

The time setting circuit 68 is comprised of a non-trigger type one-shot multivibrator 68a, which supplies an H-level signal for a certain adjusted time at the moment a pet steps on and off platform 12.

In addition, the time set for driving motor 16 is the time required to transport the solid waste on waste receiving member 41 into the solid waste receptacle 48. In this embodiment, it is set at approximately 15 seconds. In addition, an optional value time can be set by adjusting the variable resistance of the time setting circuit 68.

One of the output terminals Q of the time setting circuit 68 is connected to one of the input terminals of gate circuit 69, which consists of nand gate 69a. The other output terminal $\overline{Q}$ of the time setting circuit 68 is connected with the reset pulse transmitting circuit 70. Reset pulse transmitting circuit 70 comprises nand gate 71, one of the input terminals of which is connected to a $\overline{Q}$ output terminal of time setting circuit 68, and also, via inverter 72, to integrating circuit 73, which are disposed between another input terminal of nand gate 71 and $\overline{Q}$ output of motor driving time setting circuit 68. Reset pulse transmitting circuit 70 supplies an L-level output signal when an H-level signal from time setting circuit 68 changes to an L-level signal, at the time when the motor driving time is over. The output of the reset pulse transmitting circuit 70 is connected to the reset terminal of the judgment circuit 66. Output terminal $\overline{Q}$ of the judgment circuit 66 is connected with an input terminal of gate circuit 69. The output of gate circuit 69 is connected to driving motor 16 through motor control circuit 74. The output of gate circuit 69 is also connected to rotary solenoid 54 through a solenoid driving circuit 75. Consequently, rotary solenoid 54 is actuated to open lid 46 when electricity is supplied by the output from the gate circuit 69, that is to say, rotary solenoid 54 is opening continually while the driving motor 16 is working.

In addition, 83 shows a manually actuated circuit which initiates the conveying of waste receiving member 41 to solid waste receptacle 48. This is to say, pushing switch 83a energizes solenoid driving circuit 75, causing lid 46 to open, and causing motor control circuit 74 to be operated simultaneously, thereby driving sheet driving roller 28, frictional rollers 31a, 31b, and holding rollers 36a, 36b.

Also shown is power-on reset circuit 76. An output terminal of power-on reset circuit 76 is connected to a set-terminal of judgment circuit 66. When electric power is supplied, power-on reset circuit 76 initiates judgment circuit 66 to reset to its original condition.

The functions of the electronic circuit will be explained, with reference to the timing chart shown in FIGS. 12 and 13. The first explanation, A, is of a working action of the electronic circuit when a pet stepping on platform 12 and stepping off, has completed the process of eliminating excreta.

A. Electric power is supplied, energizing power-on reset circuit 76, and setting judgment circuit 66 to an initial condition. When a pet steps on the platform 12, infrared sensor 57 detects the presence of the pet. An H-level detection signal is supplied from sensor output detecting circuit 59. At the time when the pet steps off platform 12, the signal is changed to an L-level signal (shown in FIG. 12 A). Moreover, as soon as the pet steps on platform 12, an H-level signal is supplied for 3.8 seconds from minimum resident time detecting circuit 67 (shown in FIG. 12 G). When the pet steps off platform 12, a detection signal is supplied from the inverter 65 of the departure detecting circuit 60 (FIG. 12F).

Approximately 3.8 seconds or more is normally deemed sufficient for the pet to finish elimination. A signal which detects the pet stepping off platform 12 is supplied to the T-input terminal of the judgment circuit 66.

The input for input terminal Q of the judgment circuit 66 is already an L-level signal (FIG. 12G), so the $\overline{Q}$-output terminal of the judgment circuit 66 supplies an H-level signal (FIG. 12M).

When a pet steps off platform 12, the output of the sensor output detecting circuit 59 becomes L-level (FIG. 12A). This causes a motor driving signal of H-level to be supplied from the time setting circuit 68 (FIG. 12H). Therefore, when the condition of two input signals to the gate circuit 69 is completed, a motor driving signal is supplied for 15 seconds from the output terminal of the gate circuit 69 to the motor control circuit 74. Consequently, the driving motor 16 is driven for 15 seconds. By this action, the waste receiving member 41, which is held by the frictional rollers 31a, 31b and holding rollers 36a, 36b, is conveyed into the solid waste receptacle 48 with the solid waste on it.

In addition, at the time when an H-level output signal coming from a Q-output terminal of the time setting circuit 68 drops, a reset signal of L-level is supplied from the nand gate 71 of reset-pulse transmitting circuit 72, and is supplied to the reset terminal of the judgment circuit 66. Then, the output terminal $\overline{Q}$ of the judgment circuit 66 becomes H-level. By this means, the other input terminal of the gate circuit 69 is opened. In this way, the gate circuit 69 becomes ready to correspond with the next signal.

B. The second explanation B concerns the working of the electronic circuit when the pet steps on and off platform 12 temporarily, without intention of eliminating excreta.

It is again assumed, in this sequence, that 3.8 seconds is the approximate time required for elimination, from when a pet steps on the platform 12 to the time when the pet steps off.

Figure 13:
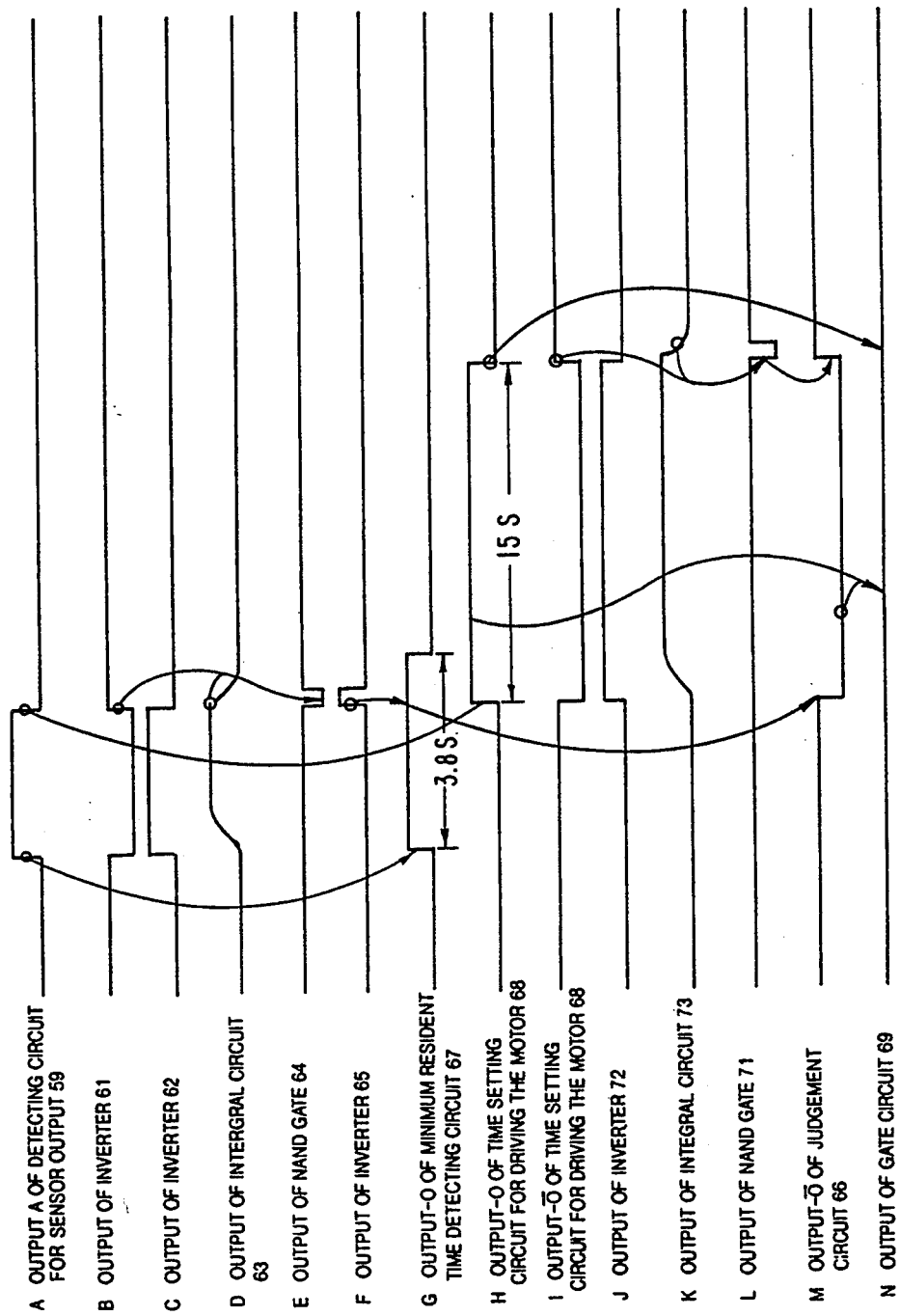
FIG. 13 is a timing chart showing when a pet steps off the platform.

The timing chart, which is shown in the FIG. 13, is almost the same as the one in FIG. 12, except for the following point: an output signal from the minimum resident time detecting circuit 67 is at H-level when a pet steps off platform 12, so a detailed explanation is omitted. When a pet steps off platform 12, an output signal from the departure detecting circuit 60 is supplied to the T-input terminal of a judgment circuit 66. If the pet steps off within 3.8 seconds, the input signal to the Q-input terminal of the judgment circuit 66 is H-level (FIG. 13G). This is why an L-level signal is supplied to the $\overline{Q}$-output terminal of the judgment circuit 66 (FIG. 13M).

As a result, no condition of two input signals to gate circuit 69 forms, gate circuit 69 closes (FIG. 13N), and the driving motor 16 is not energized. The waste receiving member 41 is not conveyed into the solid waste receptacle 48.

On the other hand, in order to get ready for the next use, the judgment circuit 66 is reset by receiving a reset signal which is supplied from the reset-pulse transmitting circuit 70 (FIG. 13L).

This reset signal is supplied when the output signal from the time setting circuit 68 has dropped. Therefore, the other side of the input terminal of gate circuit 69 is opened. The gate circuit 69 assumes a state which can react with a following signal.

In summary, this pet toilet, which is comprised of systematic functions, embodies a system in which an infrared sensor 57 detects the presence of the pet on the platform 12. When a pet steps on and off, a judgment circuit 66, part of an electronic circuit 58, determines whether or not a pet has eliminated excreta on platform 12, based upon a predetermined time interval. In case a pet does eliminate, driving motor 16 is driven for 15 seconds, and rotary solenoid 54 is actuated to open lid 46 for 15 seconds. Driving power from the driving motor 16 is transmitted on pulley 18, V belt 19, pulley 20, and a sheet carry roller 28, in that order. Consequently, frictional rollers 31a, 31b and holding rollers 36a, 36b rotate in a clockwise and counterclockwise direction respectively, as viewed in FIG. 6. Both sides of waste receiving member 41's edges are held between both rollers, and pulled by these rollers, and then are conveyed for 15 seconds to the right side of the toilet body 10, which is shown in FIG. 2. Therefore, the waste receiving member 41 is transferred to the solid waste receptacle 48 with the solid waste on it, and at the same time, a new part of the waste receiving member 41 is paid out onto the platform 12, fed from the rolled sheet 40 ready for the next use.

Lid 46 is closed when the driving power is turned off, the rotary solenoid 54 returns by means of a return spring, which is built-in to rotary solenoid 54.

The liquid waste 14, which is on the platform 12, falls through the slits 13 to the liquid waste collecting plate 15. Liquid waste 14 is gathered into hole 15a within the liquid waste collecting tray 15, and led to the liquid waste receptacle 47. The open top of the liquid waste receptacle 47 is closed by the bottom of collecting tray 15. The open top of solid waste receptacle 48 is closed by lid 46 and stage 53, insuring that no odor caused by the waste can escape from the receptacles.

When the waste collects and fills up the receptacles, the waste receiving member 41 has to be cut, so that the waste can be disposed of. Waste receiving member 41 can be cut with an ordinary razor cutter along the top edge of the lid 46 transversely.

The receptacles 45 are pulled out by holding the handle 52 from the housing section 44. The waste can be disposed of in a suitable place, such as a domestic toilet. Afterwards, the cleaned receptacles 45 can be inserted back into the housing section 44.

In case the pet does not stay on platform 12 for a long enough time to eliminate waste, or if a pet steps on the platform without purpose, the driving motor 16 and the rotary solenoid 54 are not driven. So the waste receiving member 41 is not moved, nor is waste receiving member 41 consumed uselessly.

In the preferred embodiment, an infrared sensor 57 is used as the means for detecting the presence of the pet on platform 12. Detection is not limited to this means, however. A sensor such as a supersonic sensor, a photo-sensor, a gravity sensor, and humidity sensor, and others well known in the art, can be used as long as those sensors have a detecting function.

Moreover, as a means of detection for the presence of the pet, other means such as a micro-switch and the like can be used instead of the sensor, as long as it can supply the signal to the detecting circuit 59 of the electronic circuit 58, and as long as it has the same function.

Moreover, in this invention, concerning the material for the waste receiving member 41, various kinds of material such as paper, rubber, plastic film, vinyl, cloth, and the like, can be used.

As a preferable embodiment for this invention, a paper sheet is recommended, since it is a water-soluble material which can be disposed of easily into a domestic toilet.

In the preferred embodiment, waste receiving member 41, as described, is used as a means of receiving solid waste, but it is not limited to this device. Alternatively, an endless belt can be used as a means of collecting solid waste into receptacle 48.

Figure 14:
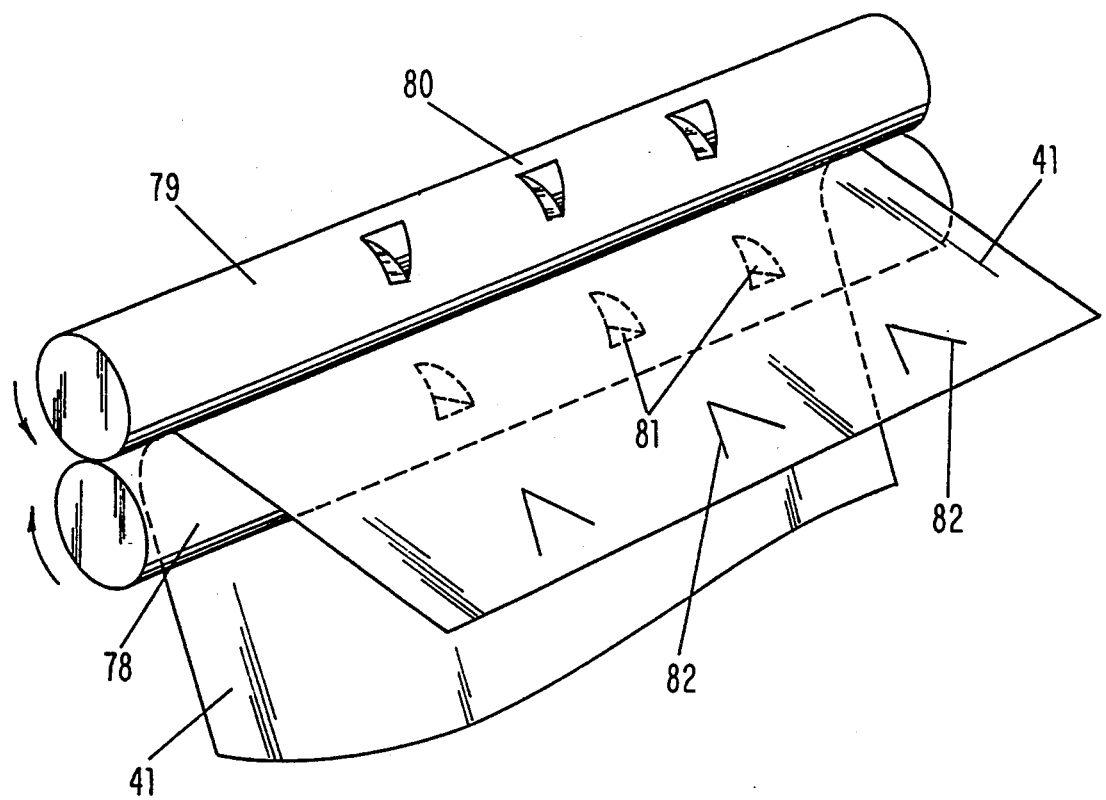
FIG. 14 is a partial perspective view of the cutting rollers.
Figure 15:
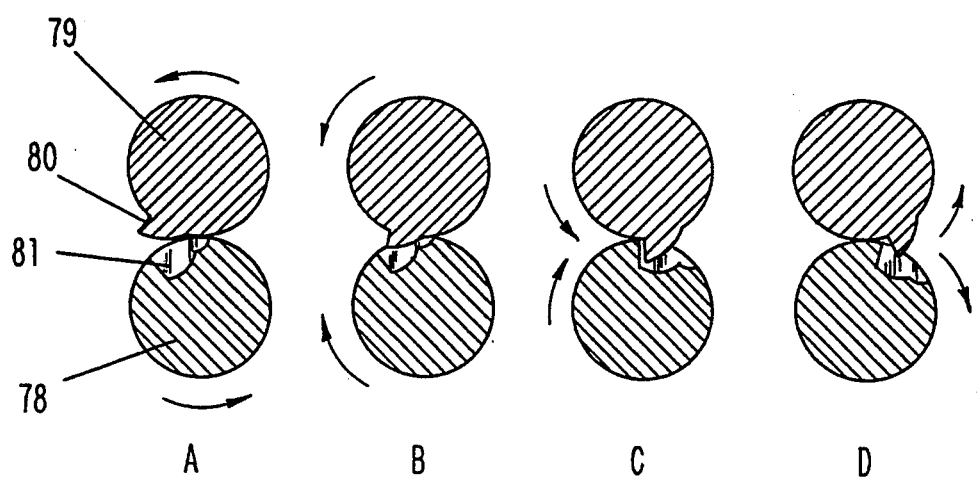
FIG. 15 is a diagrammatic sectional view of the cutting rollers.

In the preferred embodiment, for waste receiving member 41, a V-shaped notched sheet is used, but it is not limited to this device. A sheet which does not have V-shaped notches can also be used, as long as that sheet has the functions of permeability and strength. In addition, in this embodiment, a pre-notched sheet if V-shaped notches 82 is used, but it is not limited to this method of perforation. Notches can automatically be made while moving through the guide roller 42, for example, by the following means: a pair of rollers which have cutters as shown in FIGS. 14 and 15 can be attached in lieu of guide roller 42. These cutters bite into each other. The cutting rollers 78,79 are rotated respectively by a required driving means in the direction of the arrow, which is shown in FIG. 15. The sheet is led between those rollers, and after coming through the cutting rollers 78, 79, the sheet appears perforated with V-shaped notches.

In the preferred embodiment, the platform 12 is designed with slits 13 which allow for drainage of liquid waste, but it is not so limited. A lattice structure or the like can be used, provided it has sufficient strength to support the weight of the pet, and is constructed of material which is resistant to breakage due to the pet's claws. According to this device, there is less possibility for the waste receiving member 41 to be torn by the pet's claws.

In the preferred embodiment, a pulley 18, a pulley 20, and a V-belt are used as a transmission system transmitting the power of a driving motor 16 to rotate sheet driving roller 28, but it is not so limited. Alternatively, a gear system, for example, can be used as a means of transmitting the driving power.

In the preferred embodiment, a built-in geared driving motor 16 is used, but it is not limited to this method. For example, a step motor, which is driven by a pulse operating from the motor driving control circuit 74, which has the revolving speed controlled by it, and so on, can be used as a means for driving the sheet carry roller 28.

In the preferred embodiment, the time for minimum resident time detecting circuit 67 is set for 3.8 seconds. It is not limited to this; the time can be adjusted to an optional value which is set in consideration of the time when a pet steps off from the platform 12 without excreting.

Time is set at 15 seconds for time setting circuit 68, but it is not limited to this; it should be an optional value which is set in consideration of the time required to convey waste receiving member 41, which received the waste on platform 12, to the solid waste receptacle 48.

In the preferred embodiment, receptacle 45 is divided into two compartments by partition 49, denoted a liquid waste receptacle 47 and a solid waste receptacle 48, but is not limited to this design. The receptacle for liquid waste and the receptacle for solid waste can exist independently of each other. Each receptacle can be taken out of the toilet body 10 separately.

In addition, window 50 is provided on front wall 29 or side wall 10b, next to receptacles 47, 48, in order to check whether the receptacles are filled with waste.

Also, as an alternative, a disposable inner lining for the waste receptacle can be available. This lining is made by disposable materials and is formed corresponding to the dimensions of the waste receptacle box and which contains the pet waste for simple removal.

The present invention is designed to connect to a source of direct current, since the rotary solenoid of the driving motor is run by direct current, such as a car battery or an ordinary battery. Alternatively, the invention could be connected to household current by use of a current rectifier.

Additionally, a hood which has one side open as an entrance and which provides shelter for the pet, could be provided to attach to the pet toilet as a cover.

In the preferred embodiment, sheet driving roller 28 and holding rollers 36a, 36b are vertically coupled in order to transfer the waste receiving member 41 from the platform 12 to the receptacle 48 as a preferable means of facilitating the manufacture of a less costly and less complex product which has fewer maintenance problems. The main driving power pulling the waste receiving member 41 is derived from two active frictional rollers 31a,31b. The passive holding rollers 36a, 36b function to support the waste receiving member 41.

This embodiment, however, requires a more powerful mechanism to transfer a greater amount of pet waste to the receptacle, because of the increased weight of such pet waste. If the driving power of the holding rollers 36a, 36b were increased so that they rotate as do the frictional rollers 31a, 31b, then the waste receiving member 41 will be more able to move a greater amount of pet waste to the receptacle 48.

Figure 17:
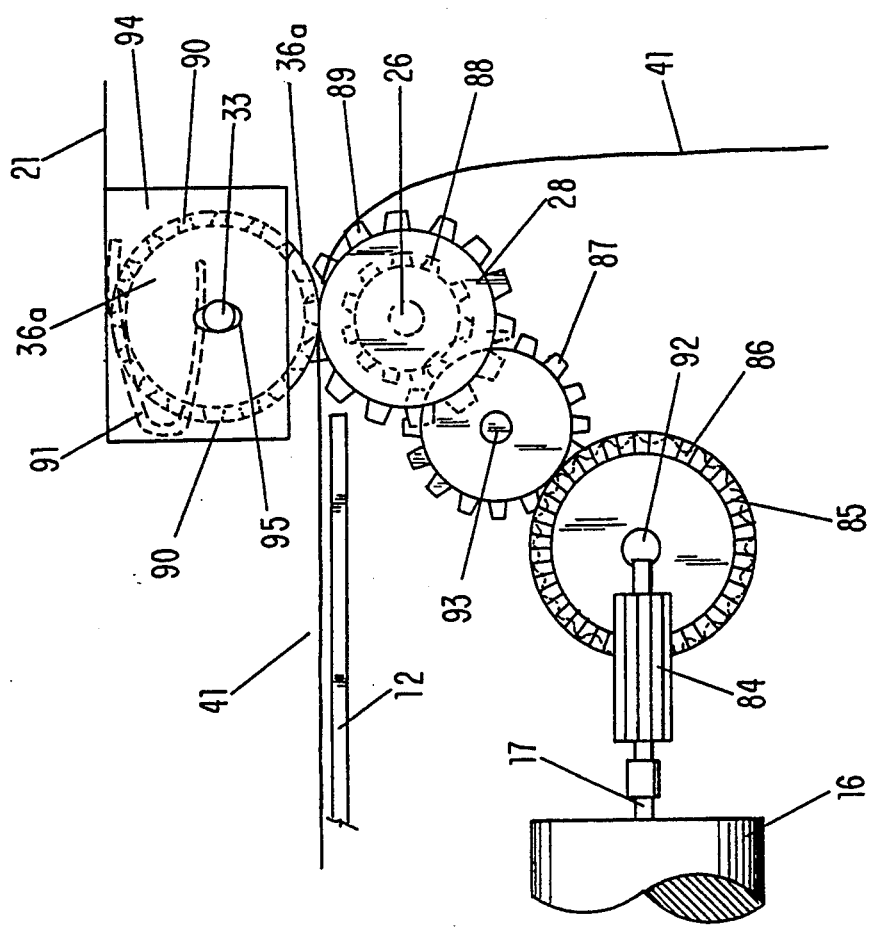
FIG. 17 is a partial side view of a transfer system of motor driving power of the second embodiment.
Figure 16:
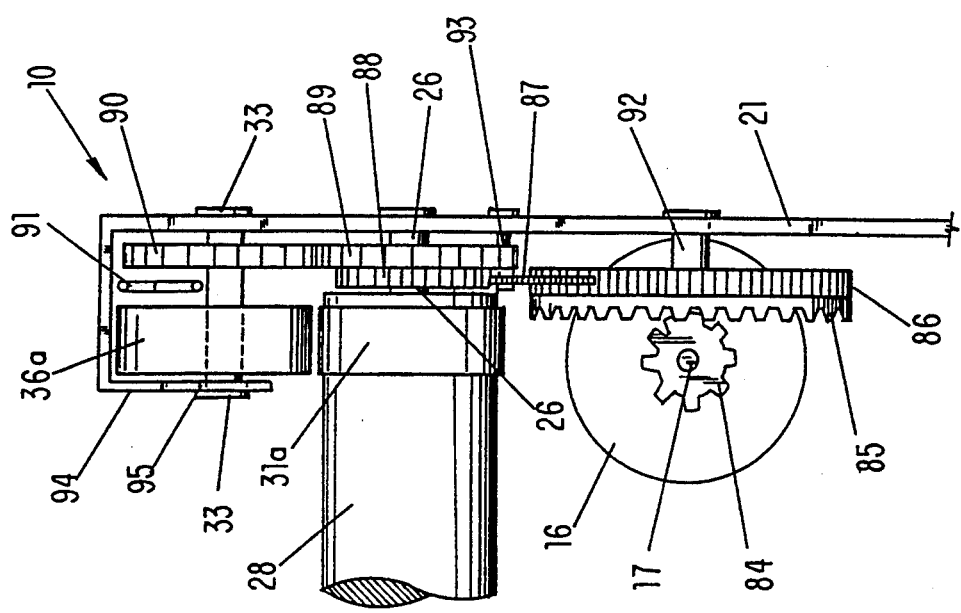
FIG. 16 is a partial front view of a transfer system of motor driving power of the second embodiment.

The second, or alternative, embodiment describes this new function of the holding roller. The detailed description follows with reference to FIGS. 16 and 17.

On rotatably mounted axis 33, a holding roller 36a and upper gear 90 are fixed coaxially. The axis 33, mounted rotatably between upper part of back wall 21 and supporting wall 94 in the through-hole bearing 95 which is formed in an oval shape, is enabled to move up and down slightly.

Axis 33 is normally urged downwardly by spring 91. Below upper gear 90, tertiary gear 89 is fixed on shaft 26 so that upper gear 90 and tertiary gear 89 are respectively coupled. Shaft 26 is fixed by the center point with sheet driving roller 28, and mounted rotatably on the back wall 21, below the holding roller section. Between tertiary gear 89 and sheet driving roller 28, inner gear 88 is fixed on shaft 26 coaxially so that tertiary gear 89, inner gear 88, and sheet driving roller 28 can be rotated as a whole. Inner gear 88 and tertiary gear 89 are coupled with secondary gear 87 and upper gear 90, respectively. Secondary gear 87 meshes with primary gear 86. Primary gear 86 and gear 85 are consequently coupled to the output axis 17 of driving motor 16. Therefore, when the driving motor is actuated, the driving power is transmitted to rotate upper gear 90 as well as tertiary gear 89 through integrally coupled output axis 17, broad gear 84, gear 85, primary gear 86, and secondary gear 87. By this device, the driving power for transporting the waste receiving member 41 is not only transmitted to the frictional roller, but also to the holding roller, thus increasing the pulling force.

Figure 18:
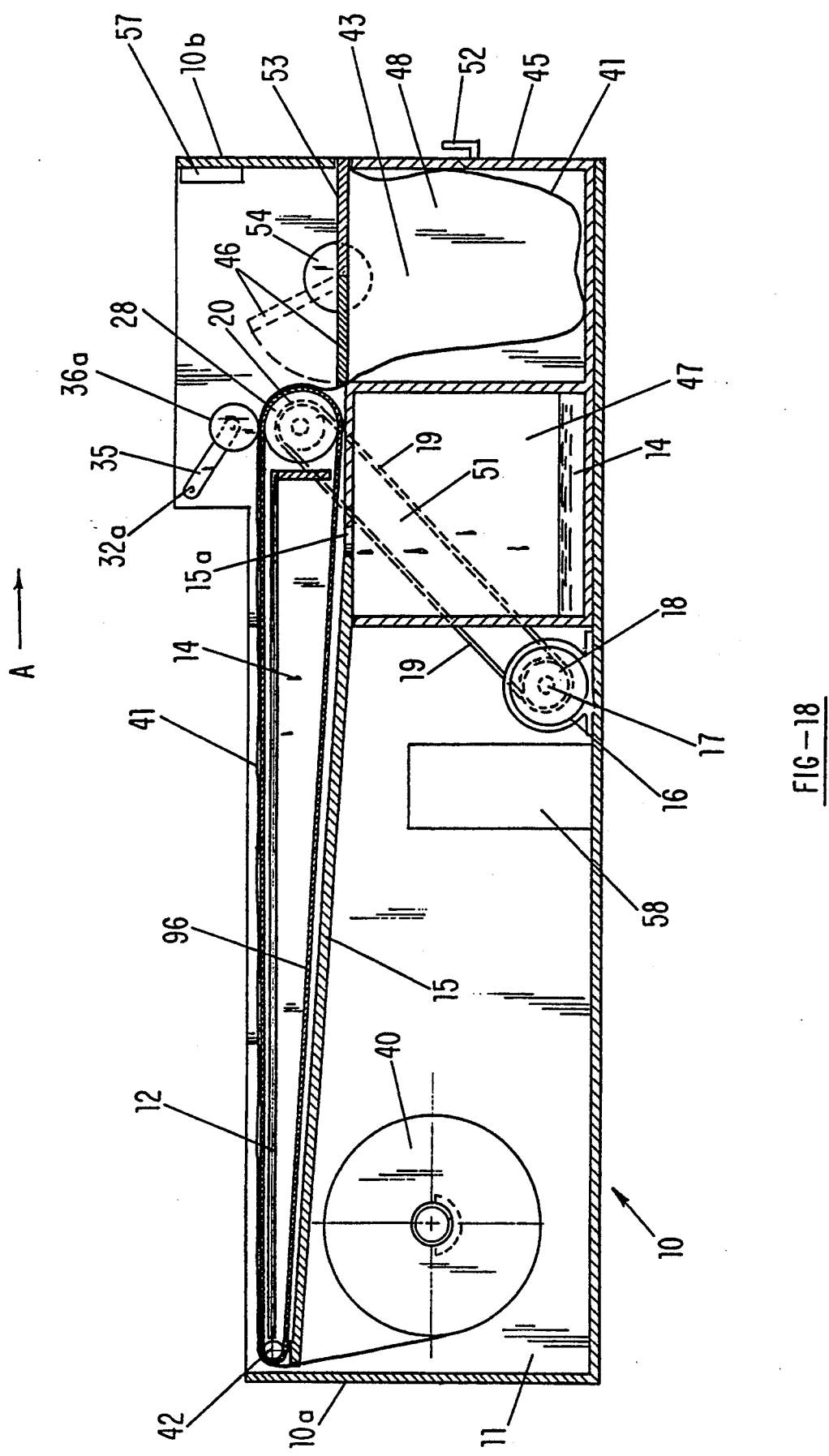
FIG. 18 is a sectional side view of the third embodiment.

Yet another alternate means of transferring the waste receiving member to the receptacle is described as a third embodiment of the present invention with reference to FIG. 18.

By using an endless belt 96, constructed of some material such as netting, the capacity for transferring a heavier amount of pet waste is obtained. Endless belt 96 is led around the sheet driving roller 28 and guide roller 42, and the upper part of the endless belt 96 is led onto the platform 12. In this structure, the driving power for rotating the sheet driving roller 28, which is transmitted from the driving motor 16 via pulley 18, V belt 19, pulley 20, respectively, causes the endless belt 96 to rotate in a clockwise direction continually.

Consequently, the "waste receiving member" 41 is transferred in the direction indicated by arrow A to the receptacle 48, and continues over the upper portion of the "liquid waste collecting tray" 15 and back through guide roller 42 to move across the platform 12 again.

The new waste receiving member is also paid out on the platform 12 due to the continuous movement of the endless belt 96. In the present embodiment, the waste receiving member is pulled by sheet driving roller 28 and slides across the platform 12 simply. However, in this third embodiment, the moving belt enables the pet toilet to accommodate a heavier amount of pet waste more effectively.

According to the present invention, a toilet for a pet can be automated to detect, by metering time, whether the pet has eliminated or not, and has a disposable arrangement for separating and covering the waste in a receptacle, comprised of the following parts: A toilet body (which has receptacles which retain the waste); a platform on which a pet can excrete, (can be freely removed and replaced on the toilet body); a waste receiving member, which is led on the platform and receives the waste on the part covering the platform; a transfer system which conveys the waste receiving member across the platform to the receptacle; a means of detection which detects when a pet has finished elimination and has left the platform; a transfer control means which drives the transfer system by an output signal from the detection means.

Therefore, the toilet body in this present invention can free the pet owner from the constant concern of maintenance. It does not allow odor from pet waste to pervade the room since the waste is covered in the receptacle. It provides a sanitary depository for pet excretion inside the home. The waste receiving member on the platform is replaced with a clean waste receiving member at every instance of use and consequently has neither offensive odor nor is unsightly until a convenient time for the pet owner to restore cleanliness, for instance, after absence of a few days.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above are hereby incorporated by reference.

What is claimed is:

1. A portable pet toilet comprising:
   a platform;
   a reel;
   a strip of waste-receiving material rolled upon said reel and movable across said platform;
   a solid waste receptacle below said platform;
   a free end of said strip disposable into said solid waste receptacle;
   motorized means for moving said strip across said platform and into said solid waste receptacle; and
   a liquid waste receptacle below said platform to collect liquid waste that passes through said platform.

2. The invention of claim 1 wherein said strip of waste-receiving material comprises a sheet of paper.

3. The invention of claim 1 wherein said motorized moving means comprises motor means and at least one driving means for moving said strip of waste-receiving material.

4. The invention of claim 3 wherein said driving means comprises a belt and pulley means.

5. The invention of claim 3 wherein said driving means comprises interlinking gear means.

6. The invention of claim 3 wherein said driving means comprises at least one sheet-driving roller.

7. The invention of claim 6 wherein said sheet-driving roller comprises a frictional surface.

8. The invention of claim 3 wherein said driving means comprises a roller-mounted endless belt.

9. The invention of claim 3 further comprising means for holding said waste receiving member firmly against said driving means.

10. The invention of claim 9 wherein said holding means comprises spring means.

11. The invention of claim 10 wherein said spring means comprises at least one rotatable holding roller pressed against said waste receiving member by a torsion spring.

12. The invention of claim 9 wherein said holding means comprises gear means.

13. The invention of claim 12 wherein said gear means comprises at least one rotatable holding roller connected by a gear train to said motor.

14. The invention of claim 1 further comprising means for actuating said motorized moving means after a pet has excreted, said actuating means comprising:
   means for detecting the presence of a pet upon said platform; and
   means for determining whether the pet has deposited excreta upon said strip of waste-receiving material.

15. An automated pet toilet apparatus comprising:
   a platform;
   means for detecting the presence of a pet upon said platform;
   means for determining whether said pet has deposited excreta upon said apparatus;
   a reel;
   a strip of waste-receiving material rolled upon said reel and movable across said platform;
   a solid waste receptacle below said platform;
   a free end of said strip disposable into said solid waste receptacle;
   means for moving said strip across said platform and into said solid waste receptacle; and
   a liquid waste receptacle below said platform to collect liquid waste that passes through said platform.

16. The invention of claim 15 wherein said means for detecting the presence of a pet upon said platform comprises infrared sensor means.

17. The invention of claim 15 wherein said means for detecting the presence of a pet upon said platform further comprises means for supplying a signal when said pet steps upon said platform and for supplying a signal when said pet steps off said platform.

18. The invention of claim 15 wherein said means for determining whether said pet has deposited excreta comprises minimum resident time detecting circuit means.

19. The invention of claim 15 wherein said means for determining whether said pet has deposited excreta further comprises pet departure detecting circuit means.

20. The invention of claim 15 wherein said means for determining whether said pet has deposited excreta further comprises judgment circuit means.

* * * * *